(12) United States Patent
Miyamoto et al.

(10) Patent No.: US 6,875,491 B2
(45) Date of Patent: Apr. 5, 2005

(54) POLYCARBONATE COMPOSITION, WRITE ONCE READ MANY OPTICAL DISC SUBSTRATE AND WRITE ONCE READ MANY OPTICAL DISC USING SAME AND PROCESS FOR PRODUCTION OF WRITE ONCE READ MANY OPTICAL DISC

(75) Inventors: Masaaki Miyamoto, Fukuoka (JP); Takao Tayama, Fukuoka (JP); Ryuji Uchimura, Fukuoka (JP); Toshimitsu Inoue, Fukuoka (JP); Shigeo Higashi, Fukuoka (JP); Masaya Ueda, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 72 days.

(21) Appl. No.: 10/274,893

(22) Filed: Oct. 22, 2002

(65) Prior Publication Data

US 2003/0153720 A1 Aug. 14, 2003

(30) Foreign Application Priority Data

Oct. 22, 2001 (JP) ..................................... P.2001-323131

(51) Int. Cl.⁷ .............................................. C08L 69/00
(52) U.S. Cl. ...................... 428/64.7; 428/412; 524/198; 524/227; 524/281; 524/308; 524/317; 525/462; 525/466; 525/467
(58) Field of Search ................................ 428/64.7, 412; 524/198, 227, 281, 308, 317; 525/462, 466, 467

(56) References Cited

U.S. PATENT DOCUMENTS 3,269,971 A  *  8/1966  Goldblum ................... 524/280
4,098,751 A  *  7/1978  Mark et al. .................. 524/281
5,973,102 A  * 10/1999  McCloskey et al. ........ 528/196
5,986,037 A    11/1999  Miyamoto et al.
6,022,943 A     2/2000  Inoue et al.
6,166,167 A    12/2000  Miyamoto et al.
6,288,205 B1    9/2001  Miyamoto et al.
6,294,641 B1    9/2001  Miyamoto et al.
6,313,259 B1   11/2001  Miyamoto et al.
6,316,580 B1   11/2001  Miyamoto et al.

FOREIGN PATENT DOCUMENTS

| JP | 62-207358 |   | 9/1987 |
| JP | 11-279396 |   | 10/1999 |
| JP | 10298418  | * | 6/2001 |
| JP | 2001-172492 | * | 6/2001 |

OTHER PUBLICATIONS

Derwent Abstracts, AN 1996–094292, XP–002247535, JP 08–003304, Jan. 9, 1996.

* cited by examiner

Primary Examiner—David J. Buttner
(74) Attorney, Agent, or Firm—Oblon, Spivak, McClelland, Maier & Neustadt, P.C.

(57) ABSTRACT

A polycarbonate composition excellent in both antistatic property and coloring matter coatability containing (a) a polycarbonate obtained by an ester exchange process, and (b) a compound having a molecular weight of from 300 to 8,000 and having any of ester bond, carbonate bond, amide bond and urethane bond in its molecule and an aromatic hydrocarbon group substituted by at least one alkyl group at the molecular end thereof, a write once read many optical disc substrate and a write once read many optical disc using the same and a process for the production of a write once read many optical disc are described.

15 Claims, No Drawings

POLYCARBONATE COMPOSITION, WRITE ONCE READ MANY OPTICAL DISC SUBSTRATE AND WRITE ONCE READ MANY OPTICAL DISC USING SAME AND PROCESS FOR PRODUCTION OF WRITE ONCE READ MANY OPTICAL DISC

FIELD OF THE INVENTION

The present invention relates to a polycarbonate composition having an excellent quality and more particularly to a polycarbonate composition having essentially improved antistatic properties and an improved coloring matter coatability, a write once read many optical disc substrate and a write once read many optical disc using such a polycarbonate composition and a process for the production of a write once read many optical disc.

BACKGROUND OF THE INVENTION

A polycarbonate is a resin excellent in mechanical properties such as impact resistance as well as in transparency and thus has been widely used. In particular, a polycarbonate has found wide application to optical disc for use in optical data recording medium which allows data reproduction and rewriting using laser beam such as audio disc, laser disc, optical disc memory and optomagnetic disc.

The industrial production of such a polycarbonate is normally accomplished by an interfacial polymerization process involving the reaction of bisphenol A with phosgene in a methylene chloride solvent. However, since this process requires the use of phosgene and methylene chloride, which can difficultly be handled on an industrial basis, a process for the production of a polycarbonate which comprises subjecting an aromatic dihydroxy compound such as bisphenol A and a carbonic acid diester such as diphenyl carbonate as starting materials to ester exchange reaction (melt polymerization) in the absence of solvent rather than using these difficult compounds has recently been partly industrialized (Japanese Patent Laid-Open No. 1988-51429, Japanese Patent Laid-Open No. 1990-153925, Japanese Patent Publication No. 1994-99552).

The polycarbonate produced by the aforementioned ester exchange reaction can be used to produce a compact disc (CD). However, CD produced from the polycarbonate obtained by ester exchange reaction disclosed in U.S. Pat. No. 5,606,008 generates a high negative static charge (typically less than −2.0 kV). This high negative static charge can cause the formed product to attract dust, deteriorating the final quality of such a disc. Further, this high static charge causes discs to attract each other. Thus, these discs are stuck to each other in transport, e.g., during conveyance from the injection machine, possibly causing the suspension of production step or the drop of yield. Moreover, this high static charge causes the polycarbonate more wettable during coloring matter coating, causing more defectives in coloring matter coating. In the case of use for CD wherein a rewritable substrate is spin-coated on the surface of a disc, a low negative static charge is required to cause the rewritable layer uniformly wettable.

In order to solve these problems, a method has been disclosed which comprises the use of an aromatic polycarbonate produced by ester exchange reaction to suppress a high negative static charge during production of CD. For example, Japanese Patent Laid-Open No. 1987-207358 and Japanese Patent Laid-Open No. 1999-279396 disclose the incorporation of an antistatic agent in an aromatic polycarbonate.

Further, U.S. Pat. No. 6,022,943 discloses an attempt to reduce the amount of terminal OH groups to not more than 10 mol % based on the total amount of terminal groups by predetermining the molar ratio of diester carbonate to aromatic dihydroxy compound higher than normal. However, this approach gives little or no effect of addition of antistatic agent. Further, even when the amount of terminal OH groups is reduced, no solutions can be given to the problems. An essential solution has thus been keenly desired.

SUMMARY OF THE INVENTION

Accordingly, the invention is intended to solve the aforementioned problems of the conventional techniques. It is an aim of the invention to provide a polycarbonate composition having an essential improvement in the antistatic properties of polycarbonate obtained by an ester exchange process.

It is another aim of the invention to provide a write once read many optical disc substrate having a good coloring matter coatability.

It is a further aim of the invention to provide a write once read many optical disc having an improved antistatic properties.

It is a still further aim of the invention to provide a process for the production of a write once read many optical disc having little coating unevenness and an improved producibility.

The inventors made extensive studies of the difference between polycarbonate obtained by interfacial polymerization process and polycarbonate obtained by ester exchange process. As a result, it was found that the polycarbonate obtained by interfacial polymerization process comprises as a by-product a linear monomer to pentamer obtained by substituting both the ends of bisphenol A as a starting material by alkylphenol in a total amount of several percents (% by weight based on polycarbonate) and the antistatic properties of the polycarbonate obtained by interfacial polymerization process are attributed to the oligomer obtained by substituting the ends of the molecule by alkylphenol. It was then found that when analogous compounds to the oligomer are mixed with a polycarbonate obtained by melting method, a melt process polycarbonate having antistatic properties can be obtained. The invention has thus been worked.

An essence of the invention lies in a polycarbonate composition comprising (a) a polycarbonate obtained by an ester exchange process, and (b) a compound having any of ester bond, carbonate bond, amide bond and urethane bond in its molecule and an aromatic hydrocarbon group substituted by at least one alkyl group at the molecular end thereof.

Another essence of the invention lies in a polycarbonate composition comprising (a) a polycarbonate obtained by an ester exchange process, and (b) an oligomer represented by the following general formula (1A);

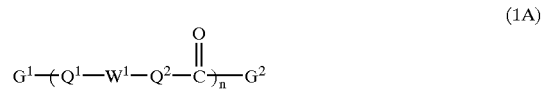

(1A)

wherein $G^1$ represents a hydrogen atom or $Ar^1\text{-}Q^2\text{-}CO-$ in which $Ar^1$ represents an aromatic hydrocarbon group substituted by at least one alkyl group; $G^2$ represents $-Q^1\text{-}W^1\text{-}Q^2\text{-}H$ or $Ar^2\text{-}Q^1\text{-}$ in which $Ar^2$ represents an aromatic hydrocarbon group substituted by at least one alkyl group; $Q^1$ represents a single bond, $-O-$ or $-NH-$; $Q^2$ represents $-O-$ or $-NH-$; $W^1$ represents a divalent group having from not smaller than 6 to not greater than 50 carbon atoms; and n represents an integer of from 1 to 30.

A further essence of the invention lies in a write once read many optical disc substrate comprising the aforementioned polycarbonate composition.

A still further essence of the invention lies in a write once read many optical disc obtained by applying a coloring matter to the aforementioned optical disc substrate.

A still further essence of the invention lies in a process for the production of a write once read many optical disc which comprises injecting the aforementioned polycarbonate to obtain a write once read many optical disc substrate, and then applying a coloring matter to the write once read many optical disc substrate by a spin coating process.

DETAILED DESCRIPTION OF THE INVENTION

The invention will be further described hereinafter.

The polycarbonate composition having excellent antistatic properties of the invention comprises (a) a polycarbonate obtained by an ester exchange process, and (b) a compound having a molecular weight of from 300 to 8,000 and having any of ester bond, carbonate bond, amide bond and urethane bond in its molecule and an aromatic hydrocarbon group substituted by at least one alkyl group at the molecular end thereof.

The compound (b) comprises a moiety having a relatively high affinity for polycarbonate in its molecule and a moiety having a relatively low affinity for polycarbonate at the molecular end thereof. Examples of the moiety having a relatively high affinity for polycarbonate include ester bond, carbonate bond, amide bond and urethane bond in the compound molecule. On the other hand, the moiety having a relatively low affinity for polycarbonate is aromatic hydrocarbon group substituted by at least one alkyl group.

The reason why the polycarbonate composition of the invention exerts an excellent antistatic effect is not necessarily obvious but can be presumed as follows.

The polycarbonate obtained by ester exchange process tends to have a high proportion of terminal hydroxyl group and hence a high negative-chargeability. The compound (b) has an aromatic hydrocarbon group substituted by alkyl group at the molecular end thereof. It is thought that the aromatic hydrocarbon exerts an effect of shielding negative-chargeability. The compound (b) has a lower molecular weight than the polycarbonate which is a main component of the composition of the invention and tends to exude to the surface of the composition when the composition is molded due to the effect of the aromatic hydrocarbon group substituted by alkyl group. At the same time, the compound (b) has a moiety having a high affinity for polycarbonate in its molecule. It is thus thought that the compound (b) can be effectively retained in the surface portion of the molded product of the polycarbonate composition.

The molecular weight of the compound (b) is from 300 to 8,000; preferably not smaller than 400, more preferably not smaller than 500; and preferably not greater than 5,000, more preferably not greater than 3,000. When the molecular weight of the compound (b) falls below the above defined range, the compound (b) can be difficultly retained in the molded composition. On the contrary, when the molecular weight of the compound (b) exceeds the above defined range, the contribution of the terminal alkyl group-substituted aromatic hydrocarbon group is extremely small.

The compound (b) has ester bond, carbonate bond, amide bond and urethane bond in its molecule. Two or more of these bonds may be contained in one molecule. Alternatively, a mixture of compounds having different bonds may be used.

Supposing that the total number of ester bond, carbonate bond, amide bond and urethane bond in the molecule is k, the quotient (molecular weight/k) is preferably from 150 to 1,000, more preferably from 200 to 500. When the quotient (molecular weight/k) falls below within the above defined range, the affinity between the polycarbonate (a) and the compound (b) is good.

The compound (b) is preferably an oligomer having a repeating unit and ester, carbonate, amide or urethane bond in its molecule from the standpoint of producibility. In other words, the oligomer which is the compound (b) is selected from the group consisting of carbonate oligomer, ester oligomer, amide oligomer and urethane oligomer. These oligomers each has an ester bond, carbonate bond, amide bond or urethane bond in its molecule and thus exhibits a relatively high affinity for polycarbonate. Examples of the oligomer having ester bond include ethylene terephthalate oligomer, and butylene terepthalate oligomer. Examples of the oligomer having carbonate bond include bisphenol A carbonate oligomer. Examples of the oligomer having amide bond include caprolactam oligomer, and hexamethylene diamine-adipic acid oligomer. Examples of the oligomer having urethane bond include tolylene diisocyanate-propylene glycol oligomer.

The oligomer to be used as the compound (b) is preferably represented by the following general formula (1A):

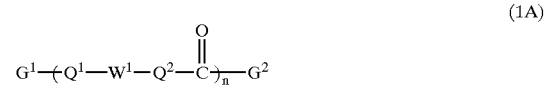

(1A)

wherein $G^1$ represents a hydrogen atom or $Ar^1\text{-}Q^2\text{-}CO\text{—}$ in which $Ar^1$ represents an aromatic hydrocarbon group substituted by at least one alkyl group; $G^2$ represents $\text{-}Q^1\text{-}W^1\text{-}Q^2\text{-}H$ or $Ar^2\text{-}Q^1\text{-}$ in which $Ar^2$ represents an aromatic hydrocarbon group substituted by at least one alkyl group; $Q^1$ represents a single bond, —O— or —NH—; $Q^2$ represents —O— or —NH—; $W^1$ represents a divalent group having from not smaller than 6 to not greater than 50 carbon atoms; and n represents an integer of from 1 to 30.

Preferred among the oligomers represented by the general formula (1A) is oligomer represented by the following general formula (1B):

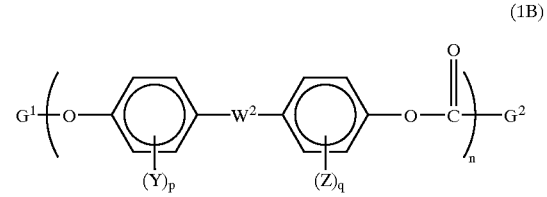

(1B)

wherein $G^1$ represents a hydrogen atom or $Ar^1$—O—CO— in which $Ar^1$ represents an aromatic hydrocarbon group substituted by at least one alkyl group; $G^2$ represents a group represented by the following general formula (2A):

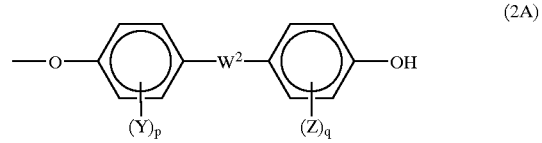

(2A)

or $Ar^2$—O— in which $Ar^2$ represents an aromatic hydrocarbon group substituted by at least one alkyl group; $W^2$ represents a single bond or a group selected from the group consisting of $C_1$–$C_8$ alkylene group, $C_2$–$C_8$ alkylidene group, $C_5$–$C_{15}$ cycloalkylene group, $C_5$–$C_{15}$ cycloalkylidene group and divalent groups represented by —O—, —S—, —CO—, —SO— and —$SO_2$—; Y and Z may be the same or different and each represents a halogen atom or $C_1$–$C_6$ hydrocarbon group; p and q may be the same or different and each represents an integer of from 0 to 2; and n represents an integer of from 1 to 30.

In the general formula, $Ar^1$ and $Ar^2$ each represents an aromatic hydrocarbon group substituted by at least one alkyl group. Preferred examples of the aromatic hydrocarbon group include phenyl group, and naphthyl group, particularly phenyl group. The alkyl group is preferably a $C_1$–$C_{20}$ alkyl group, more preferably a group represented by the following general formula (5A):

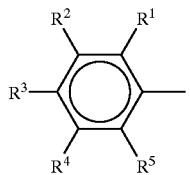

(5A)

wherein $R^1$ to $R^5$ each independently represents a hydrogen atom or $C_1$–$C_{20}$ alkyl group, with the proviso that $R^1$ to $R^5$ do not represent a hydrogen atom simultaneously.

In the general formula (4), $R^1$ to $R^5$ each independently represents a hydrogen atom or a $C_1$–$C_{20}$ alkyl group. In order to enhance the antistatic effect, the total number of carbon atoms in $R^1$ to $R^5$ is preferably not smaller than 2, more preferably not smaller than 3. Further, the total number of carbon atoms in $R^1$ to $R^5$ is preferably not greater than 10 from the standpoint of producibility of oligomer.

It is particularly preferred that the aromatic hydrocarbon group having at least one alkyl group be an alkylphenyl group. Specific examples of the alkylphenyl group include mesityl group, tertiary butylphenyl group, isopropylphenyl group, and 1,3,5,7-tetramethyloctylphenyl group. Preferred among these alkylphenyl groups are tertiary butylphenyl groups (t-butylphenyl groups). Particularly preferred among these t-butylphenyl groups is 4-t-butylphenyl group.

The n (number of repeating units) in the general formula (1) is normally not greater than 30, preferably not greater than 28, more preferably not greater than 26. For example, an oligomer, if produced by an interfacial polymerization process, is normally obtained in the form of mixture of oligomers having different numbers of repeating units. The number-average number of repeating units (m) in the oligomer to be used in the invention is preferably not greater than 20, more preferably not greater than 15, particularly not greater than 10.

The amount of the compound (b) in the polycarbonate composition of the invention is normally from 0.01 to 20 parts by weight, preferably from 0.05 to 18 parts by weight, more preferably from 0.1 to 16 parts by weight based on 100 parts by weight of the polycarbonate as component (a). A plate such as optical disc substrate produced from a polycarbonate composition comprising the compound (b) in an amount far less than the above defined range exhibits a negative-charged voltage of higher than −2.0 kV that makes itself easy to attract dust and makes itself more wettable during coloring matter coating, causing more defectives in coloring matter coating. When the plate such as optical disc is produced from a polycarbonate composition comprising the compound (b) in an amount far more than the above defined range, a large amount of foreign materials are attached to the stamper, causing the attachment of foreign materials to the surface of the disc thus produced to disadvantage.

Since it is thought that when the oligomer (b) has a relatively small number (n) of repeating units, the resulting antistatic properties are high, the proportion of the oligomer (b) having from 2 to 4 repeating units in the composition is preferably from 0.02 to 15 parts by weight, more preferably from 0.05 to 10 parts by weight based on 100 parts by weight of the polycarbonate as component (a).

The compound as the component (b) of the invention can be produced by any known method. In particular, the oligomer represented by the general formula (1B) is preferably obtained by an interfacial polymerization process. In accordance with the interfacial polymerization process, an aromatic dihydroxy compound and phosgene are reacted. When the reaction product grows to an oligomer having a desired number of repeating units, it can be reacted with an alkylphenol compound to control the number of repeating units in the oligomer. During this procedure, by selecting the kind of the alkylphenol compound to be used as a terminating agent, the molecular end of the oligomer can be varied.

Examples of the alkylphenol to be used in the introduction of alkylphenyl group as molecular end of oligomer (b) include 2-n-ethylphenol, 3-n-ethylphenol, 4-n-ethylphenol, 2-n-propylphenol, 3-n-propylphenol, 4-n-propylphenol, 2-n-butylphenol, 3-n-butylphenol, 4-n-butylphenol, 2-isobutylphenol, 3-isobutylphenol, 4-isobutylphenol, 2-t-butylphenol, 3-t-butylphenol, 4-t-butylphenol, 2-n-pentylphenol, 3-n-pentylphenol, 4-n-pentylphenol, 3-n-hexylphenol, 3-n-hexylphenol, 4-n-hexylphenol, 2,3-di-t-butylphenol, 2,4-di-t-butylphenol, 2,5-di-t-butylphenol, 3,4-di-t-butylphenol, 3,5-di-t-butylphenol, 2-n-dodecylphenol, 3-n-dodecylphenol, 4-n-dodecylphenol, and 1,3,5,7-tetramethyloctylphenol.

Preferred among these alkylphenols are 4-t-butylphenol and 1,3,5,7-tetramethyloctylphenol from the standpoint of producibility and handleability of oligomer. Particularly preferred among these alkylphenols is 4-t-butylphenol.

$G^1$ and $G^2$ in the general formula (1A) or (1B) which is a molecular end of the oligomer (b) each represents a group having an alkylphenyl group derived from alkylphenol or a hydroxyl group derived from dihydroxy compound. In the molecular end of the oligomer to be used in the invention, the alkylphenyl group is preferably predominant. In some detail, the proportion of alkylphenyl group in the total number of molecular ends is preferably not smaller than 80 mol %, more preferably not smaller than 90 mol %. In this case, an oligomer (b) having an alkylphenyl group at both molecular ends thereof is a main component of the compound of the invention.

A particularly preferred oligomer having an alkylphenyl group at both molecular ends thereof to be used in the invention is represented by the following general formula (4):

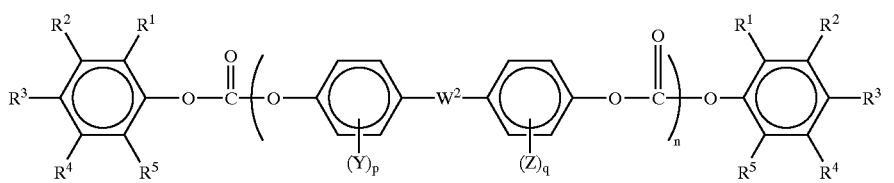

(4)

wherein $W^2$ represents a single bond or a group selected from the group consisting of $C_1$–$C_8$ alkylene group, $C_2$–$C_8$ alkylidene group, $C_5$–$C_{15}$ cycloalkylene group, $C_5$–$C_{15}$ cycloalkylidene group and divalent groups represented by —O—, —S—, —CO—, —SO— and —SO$_2$—; Y and Z may be the same or different and each represents a halogen atom or $C_1$–$C_6$ hydrocarbon group; p and q may be the same or different and each represents an integer of from 0 to 2; n represents an integer of from 1 to 30; and $R^1$ to $R^5$ each independently represents a hydrogen atom or $C_1$–$C_{20}$ alkyl group, with the proviso that $R^1$ to $R^5$ do not represent a hydrogen atom simultaneously.

A plate such as optical disc substrate produced by adding the aforementioned compound (b) comprising as a main component an oligomer having an alkylphenyl group at both the molecular ends thereof to the polycarbonate in a predetermined amount exhibits a charged voltage of higher than –2.0 kV that makes itself impossible to attract dust and makes itself less wettable during coloring matter coating, causing less defectives in coloring matter coating. On the contrary, a plate such as optical disc substrate produced from a polycarbonate which does not contain the aforementioned oligomer in a predetermined amount exhibits a charged voltage of lower than –2.0 kV that makes itself easy to attract dust and makes itself more wettable during coloring matter coating, causing more defectives in coloring matter coating. The plate such as optical disc substrate produced from the aromatic polycarbonate having excellent antistatic properties of the invention preferably exhibits a charged voltage of from –2 to 8 kV, more preferably from –1.5 to 7.5 kV, particularly from –1.0 to 7.0 kV.

In addition, the plate such as optical disc substrate preferably exhibits a contact angle of not smaller than 78 degrees, more preferably not smaller than 80 degrees, particularly not smaller than 82 degrees with respect to water droplet. The plate such as optical disc substrate having a contact angle of not smaller than 78 degrees with respect to water droplet exhibits a deteriorated wettability during coloring matter coating, causing less defectives in coloring matter coating. On the contrary, the plate such as optical disc substrate having a contact angle of smaller than 78 degrees with respect to water droplet exhibits a raised wettability during coloring matter coating, causing more defectives in coloring matter coating.

The aforementioned polycarbonate composition of the invention preferably further comprises an antistatic agent (c) incorporated therein. The incorporation of an antistatic agent makes it possible for the polycarbonate composition to exert an enhanced antistatic effect. The content of the antistatic agent is preferably from 0.001 to 0.1 parts by weight, more preferably from 0.005 to 0.09 parts by weight based on 100 parts by weight of the polycarbonate. The antistatic agent is preferably a polyoxyethylene fatty acid ester. Examples of the polyoxyethylene fatty acid ester employable herein include polyoxyethylene sorbitan monolaurate, polyoxyethylene monolaurate, polyoxyethylene sorbitan stearate, polyoxyethylene lauryl ether, polyoxyethylene oleyl ether, and polyoxyethylene stearyl ether. Particularly preferred among these polyoxyethylene fatty acid esters is polyoxyethylene sorbitan monolaurate.

The polycarbonate composition of the invention comprises as a main component a polycarbonate (a). The polycarbonate (a) can be obtained by subjecting an aromatic dihydroxy compound and a carbonic acid diester as starting materials to ester exchange reaction in the presence of an ester exchange catalyst.

The aromatic dihydroxy compound to be used as a starting material of the polycarbonate is normally represented by the following general formula (2B):

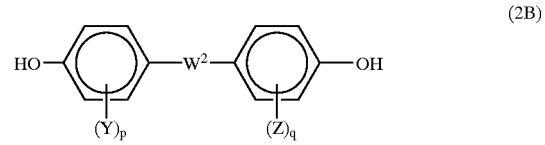

(2B)

wherein $W^2$ represents a single bond or a group selected from the group consisting of $C_1$–$C_8$ alkylene group, $C_2$–$C_8$ alkylidene group, $C_5$–$C_{15}$ cycloalkylene group, $C_5$–$C_{15}$ cycloalkylidene group and divalent groups represented by —O—, —S—, —CO—, —SO— and —SO$_2$—; Y and Z may be the same or different and each represents a halogen atom or $C_1$–$C_6$ hydrocarbon group; and p and q may be the same or different and each represents an integer of from 0 to 2.

Examples of the aromatic dihydroxy compound represented by the general formula (2B) include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butyl phenyl) propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl) cyclohexane, biphenols such as 4,4'-dihydroxybiphenyl and 3,3',5,5'-tetramethyl-4,4'-dihydroxybiphenyl, bis(4-hydroxyphenyl)sulfone, bis(4-hydroxyphenyl)sulfide, bis(4-hydroxyphenyl)ether, and bis(4-hydroxyphenyl)ketone. Particularly preferred among these aromatic dihydroxy compounds is 2,2-bis(4-hydroxyphenyl)propane (hereinafter abbreviated as "bisphenol A"). These aromatic dihydroxy compounds may be used singly or in admixture of two or more thereof.

The carbonic acid diester to be used in the invention is represented by the following general formula (3):

(3)

wherein A and A' may be the same or different and each represents a $C_1$–$C_{18}$ aliphatic or substituted aliphatic group or aromatic or substituted aromatic group.

Examples of the carbonic acid diester represented by the general formula (3) include carbonic acid dialkyl compounds such as dimethyl carbonate, diethyl carbonate and di-t-butyl carbonate, and diphenyl carbonate. Preferred among these carbonic acid diesters are diphenyl carbonate and substituted diphenyl carbonate. Particularly preferred among these carbonic acid diesters is diphenyl carbonate. These carbonic acid diesters may be used singly or in admixture of two or more thereof.

In order to produce the aromatic polycarbonate of the invention, it is preferred that as the aromatic dihydroxy compound there be used bisphenol A, as the carbonic acid diester there be used diphenyl carbonate and the amount of diphenyl carbonate be from 1.01 to 1.30 mols, more preferably from 1.02 to 1.20 per mol of bisphenol A. When the molar ratio of diphenyl carbonate to disphenol A falls below 1.01, the resulting aromatic polycarbonate has an increased number of terminal OH groups to form a polymer having a deteriorated heat stability. On the contrary, when the molar ratio of diphenyl carbonate to disphenol A exceeds 1.30, the rate of ester exchange reaction decreases under the same conditions, giving a tendency that the aromatic polycarbonate having a desired molecular weight can be difficultly produced.

In the invention, an ester exchange catalyst is used to obtain the desired polycarbonate. As such a catalyst there is used an alkaline metal compound and/or alkaline earth metal compound. A basic compound such as basic boron compound, basic phosphorus compound, basic ammonium compound and amine-based compound may be auxiliarily used. However, it is particularly preferred that an alkaline metal compound and/or alkaline earth metal compound be singly used from the standpoint of physical properties or handleability.

The amount of the catalyst to be used is preferably from $1\times10^{-8}$ to $5\times10^{-6}$ mols, more preferably from $1\times10^{-7}$ to $3\times10^{-6}$ mols, particularly from $2\times10^{-7}$ to $2\times10^{-6}$ mols per mol of the aromatic dihydroxy compound. When the amount of the catalyst falls below the above defined range, a polymerization activity required to produce a polycarbonate having a predetermined molecular weight and a desired amount of terminal hydroxy group cannot be obtained. When the amount of the catalyst exceeds the above defined range, the resulting polymer exhibits a deteriorated hue and has increased branches that impair the formability thereof.

Examples of the alkaline metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydrate, potassium borohydrate, lithium borohydrate, cesium borohydrate, borophenylate sodium, borophenylated potassium, borophenylated lithium, borophenylated cesium, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenylphosphate, dipotassium phenylphosphate, dilithium phenylphosphate, dicesium phenylphosphate, alcholate and phenolate of sodium, potassium, lithium and cesium, and disodium, dipotassium, dilithium and dicesium salts of bisphenol A.

Examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Specific examples of the basic boron compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylborone, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethyl ammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenyl ammonium hydroxide, and butyltriphenylammonium hydroxide.

Examples of the amine-based compound include 4-aminopyridine, 2-aminopyridine, N,N-dimethyl-4-aminopyridine, 4-diethylamino pyridine, 2-hydroxypyridine, 2-methoxypyridine, 4-methoxy pyridine, 2-dimethylaminoimidazole, 2-methoxyimidazole, imidazole, 2-mercaptoimidazole, 2-methylimidazole, and aminoquinoline.

An ester exchange reaction is normally effected in two or more stages. In some detail, the first stage reaction is effected at a temperature of from 120° C. to 260° C., preferably from 180° C. to 240° C., and a pressure of from $9.3\times10^4$ to $1.33\times10^3$ Pa for 0.1 to 5 hours, preferably 0.1 to 3 hours. Subsequently, the reaction temperature is raised with the reduction of the pressure in the reaction system. Eventually, polycondensation reaction is effected at a reduced pressure of 133 Pa or lower and a temperature of from 240° C. to 320° C.

The reaction may be effected batchwise or continuously, singly or in combination. The reaction apparatus may be tank-shaped, cylindrical or column-shaped.

The viscosity-average molecular weight of the polycarbonate of the invention is preferably from 12,000 to 20,000, more preferably from 13,000 to 19,000. When the viscosity-average molecular weight of the polycarbonate is too low, the resulting polycarbonate exhibits a practically unacceptable strength. When the viscosity-average molecular weight of the polycarbonate is too high, the resulting polycarbonate leaves something to be desired in formability and optical characteristics.

The alkyl group-substituted aromatic hydrocarbon which exhibits antistatic properties in the polycarbonate composition of the invention is present in the compound (b). In addition, the polycarbonate (a) may be terminated by the alkyl group-substituted aromatic hydrocarbon group.

In the case where the polycarbonate is terminated by the alkyl-substituted aromatic hydrocarbon group, the proportion of the alkyl-substituted aromatic hydrocarbon group in all polycarbonate terminals is preferably not smaller than 0.1 mol %, more preferably not smaller than 1 mol %. When the content of oligomer in the composition is too low or the proportion of alkyl-substituted aromatic hydrocarbon group in oligomer terminals is too low, the proportion of terminal groups can be properly predetermined, e.g., by raising the proportion of alkyl-substituted aromatic hydrocarbon group in polycarbonate terminals.

The production of the polycarbonate terminated by an alkyl-substituted aromatic hydrocarbon group is accomplished by subjecting the aforementioned aromatic dihydroxy compound and carbonic acid diester to ester exchange reaction in the presence of an ester exchange catalyst wherein a phenol represented by the following general formula (5B) or a carbonic acid diester represented by the following general formula (6) is present in the reaction system:

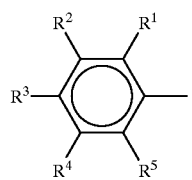

(5B)

wherein $R^1$ to $R^5$ each independently represents a hydrogen atom or $C_1$–$C_{20}$ alkyl group, with the proviso that $R^1$ to $R^5$ do not represent a hydrogen atom simultaneously.

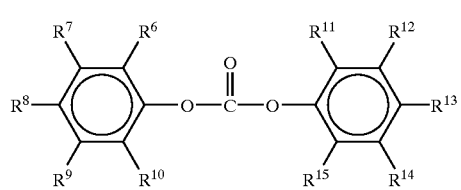

(6)

wherein $R^6$ to $R^{15}$ each represents a hydrogen atom or $C_1$–$C_{20}$ alkyl group, with the proviso that $R^6$ to $R^{15}$ do not represent a hydrogen atom simultaneously.

The addition of the aforementioned phenol or carbonic acid diester may be effected with the aforementioned starting materials, during the reaction or at the end of the reaction. However, the addition of the aforementioned phenol or carbonic acid diester is preferably effected when the intrinsic viscosity [η] of the polymer reaches less than 0.2 dl/g. When the intrinsic viscosity [η] of the polymer is not smaller than 0.2 dl/g, the miscibility and dispersibility of these materials with the polymer are deteriorated as the viscosity of the polymer increases, causing the deterioration of the effect exerted by the introduction of these materials. More preferably, the addition of these materials is effected when the intrinsic viscosity [η] of the polymer is not greater than 0.19 dl/g.

In particular, the phenol represented by the general formula (5B) is preferably added when the intrinsic viscosity [η] of the polymer is from not smaller than 0.03 dl/g to smaller than 0.2 dl/g from the standpoint of the effect exerted by introduction. This is because when such a phenol is previously added together with the aforementioned starting materials, the aromatic hydroxy compound produced with ester exchange and the phenol represented by the general formula (5B) are together distilled off, causing the deterioration of the effect exerted by introduction of these materials. More preferably, the phenol represented by the general formula (5B) is added when the intrinsic viscosity [η] of the polymer is from not smaller than 0.04 dl/g to not greater than 0.19 dl/g.

In order to produce the composition of the invention, mixing can be carried out by any known methods. For example, the aforementioned oligomer may be subjected to dispersion and mixing with a polycarbonate powder by a ribbon blender, super mixer or the like. The mixture may be then subjected to melt-kneading by an extruder or the like.

In the invention, an acidic compound or precursor thereof such as sulfonic acid compound and precursor thereof is preferably added as a deactivator to deactivate the ester exchange catalyst. In some detail, p-toluenesulfonic acid, methyl p-toluenesulfonate, butyl p-toluenesulfonate, etc. are particularly preferred. These compounds may be used singly or in combination of two or more thereof.

If necessary, additives such as stabilizer, ultraviolet absorber, releasing agent and coloring agent may be kneaded with the resin.

The optical disc substrate of the invention can be obtained by subjecting the aforementioned polycarbonate to injection according to any known method. The optical disc substrate thus produced can be used as a write once read many optical disc substrate for optical data recording medium which allows reproduction and rewriting of data using laser beam such as audio disc, laser disc, optical disc memory and optomagnetic disc.

The write once read many optical disc of the invention comprises a formed substrate having a plurality of cocentrically disposed guide grooves produced by the injection of the aforementioned aromatic polycarbonate. During the injection, the shape of pits and grooves having a submicron size marked on a predetermined stamper are faithfully transferred to the surface (referred to as "signal surface" herein) of a transparent disc-shaped formed substrate.

A representative example of such a write once read many optical disc is a CD-R type optical disc comprising a coloring matter recording layer, a reflective layer and a protective layer laminated in this order on the aforementioned formed substrate. Other representative examples of the write once read many optical disc include DVD-R type optical disc made of a laminate having a coloring matter recording layer, a reflective layer and optically a protective layer provided on the aforementioned formed substrate and a disc-shaped substrate (dummy plate) stuck to each other with an adhesive with the recording layer disposed inside, and DVD-R type optical disc having two sheets of the aforementioned laminates stuck to each other with an adhesive with the recording layer thereof inside.

In the production process of the invention, the coloring matter recording layer which records and reads signal in the write once read many optical disc is formed by applying a coloring matter directly to the signal surface of the substrate.

The application of the coloring matter can be normally carried out by a spin coating method. In some detail, a coloring matter solution having an organic coloring matter dissolved in an organic solvent is applied to the signal surface of the formed substrate in such a manner that the grooves formed thereon are filled with the coloring matter solution. Spin coating is normally carried out by using a spin coater comprising a coating solution dispensing device (dispense nozzle), a spinner head, a fly preventive wall and an exhaust device according to the following procedure. Firstly, the formed substrate is placed on the spinner head.

Subsequently, the coating solution is supplied from the nozzle of the coating solution dispensing device into the surface of the inner portion of the substrate, preferably the position disposed 2 to 3 mm inward from the innermost edge of the groove, while the spinner head is being rotated by a driving motor. The coating solution which has been supplied onto the substrate is then radially casted toward the periphery of the substrate by a centrifugal force to form a coat layer. During spin coating, dried gas such as air is introduced through an opening (gas inlet) provided in the upper portion of the fly preventive wall. The gas thus introduced is then allowed to flow over the coat layer. The gas is then discharged from the lower portion of the spin coater. The flow of gas causes the solvent to be removed from the coat layer so that the coat layer is dried. If necessary, the substrate may be put in a drying oven call baking oven so that the remaining solvent can be removed as thoroughly as possible.

In the case of write once read many optical disc, as the coloring matter there may be selected a coloring matter having an absorption range within a laser beam wavelength range (300 to 850 nm). Specific examples of such a coloring matter include azo coloring matter, cyanine coloring matter, phthalocyanine coloring matter, azlenium coloring matter, squarilium coloring matter, polymethine coloring matter, pyrilium coloring matter, thiopyrilium coloring matter, indoaniline coloring matter, naphthoquinone coloring matter, anthraquinone coloring matter, triallylmethane coloring matter, aminium coloring matter, diimonium coloring matter, metal chelate-based coloring matter comprising azo-based coordination compound and metal, metal complex, and mixture thereof. preferably, any organic coloring matter selected from the group consisting of azo-based coloring matter, cyanine-based coloring matter and phthalocyanine-based coloring matter. These coloring matters have an excellent signal sensitivity, a good solubility in solvent and a good light-resistance, making it possible to obtain a high quality write once read many optical disc.

Specific examples of the organic solvent for coloring matter solution include esters such as butyl acetate and cellosolve acetate, ketones such as methyl ethyl ketone, cyclohexanone and methyl isobutyl ketone, chlorinated hydrocarbons such as dichloromethane, 1,2-dichloroethane and chloroform, amides such as dimethylformamide, hydrocarbons such as cyclohexane, ethers such as tetrahydrofurane, ethyl ether and dioxane, alcohols such as ethanol, n-propanol, isopropanol, n-butanol and diacetone alcohol, fluorine-based solvents such as 2,2,3,3-tetrafluoropropanol, and glycol ethers such as ethylene glycol monomethyl ether, ethylene glycol monoethyl ether and propylene glycol monomethyl ether. These solvents may be used singly or in combination of two or more thereof taking into account the solubility of the coloring matter used. Preferred among these solvents are fluorine-based solvents such as 2,2,3,3-tetrafluoropropanol, octafluoropentanol and dibutyl ether.

An Ag or Au reflective layer may be then formed on the surface of the coloring matter recording layer by a sputtering method. If necessary, a protective layer may be provided on the surface of the reflective layer to obtain a laminate having a protective layer formed thereon. In the case of CD-R, a single substrate is used. In the case of DVD-R, two sheets of the aforementioned substrates may be laminated to attain a high density arrangement.

A write once read many optical disc substrate and a write once read many optical disc comprising the polycarbonate composition of the invention exhibit an essentially improved antistatic property and an improved coloring matter coatability.

The invention will be further described in the following examples and comparative examples. The polycarbonate compositions and polycarbonates obtained in the following examples and comparative examples were measured and evaluated for physical properties and other properties according to the following methods.

(1) Viscosity-average molecular weight (Mv)

A 6 g/l methylene chloride solution of the specimen was measured for intrinsic viscosity by means of a Ubbellohde viscometer. From the intrinsic viscosity thus measured was then determined the viscosity-average molecular weight of the specimen by the following equation:

$$[\eta] = 1.23 \times 10^{-4} (Mv)^{0.83}$$

(2) Proportion of alkylphenyl group in all molecular terminals in oligomer 0.02 g of the sample was dissolved in 0.4 ml of chloroform. Using a 1H-NMR (JNM-A1400, produced by JEOL), the sample was then measured at 30° C. for the amount of alkylphenoxy groups and terminal hydroxyl groups in oligomer. The values thus measured were then summed to determine the total number of molecular terminals. From the total number of molecular terminals was then calculated the proportion of alkylphenoxy group in all molecular terminals in oligomer by the following equation:

$$\text{Proportion of alkylphenoxy group (mol \%)} = (\text{number of alkylphenoxy groups/total number of molecular terminals}) \times 100$$

(3) Number-average number of repeating units (m) in oligomer

Supposing that there are N repeating units in the oligomer and the content (% by weight) of repeating units in an oligomer having a certain number p of repeating units is Mp, the number-average number of repeating units in the oligomer can be determined by the following equation:

$$m = (\Sigma Np \times Mp)/100$$

(4) Parts by weight of oligomer (b) and total parts by weight of oligomers having from 2 to 4 repeating units (n) based on 100 parts by weight of polycarbonate as component (a)

1 g of the polycarbonate composition obtained was dissolved in 10 ml of tetrahydrofurane. The solution was then measured by reversed-phase partition chromatography. For reversed-phase partition chromatography, a mixture of tetrahydrofurane and water was used as an eluting solution. The ratio of tetrahydrofurane to water was gradiented to 100/0 starting with 50/50 in 1 hour. Under these conditions, measurement was conducted at a column temperature of 40° C.

For detection, a UV detector having a wavelength of 270 nm (SPD-6A, produced by Shimadzu Corporation) was used. For determination, the calibration curve of an oligomer having one repeating unit (n) was used. The various peak areas were converted to the weight of the oligomer having one repeating unit (n). The various oligomers were each then determined for weight. The total amount of the oligomer (b) and the total parts by weight of oligomers having from 2 to 4 repeating units (n) based on 100 parts by weight of the polycarbonate as component (a) were then calculated.

(5) Charged voltage (kV)

Using a Type SK-200 static charge meter (produced by KEYENCE CORPORATION), the formed substrates which had just been obtained in the following examples and comparative examples were each measured for charged voltage at a point 6.0 cm apart from the substrate.

(6) Contact angle with respect to water droplet (degree)

The formed substrate which had been just obtained was used similarly to the measurement of charged voltage (5). Ultrapure water was dropped onto the surface of the formed substrate. Using a contact angle meter (liquid dropping method; produced by Kyowa Interface Science Co., Ltd.), the radius r and height h of the droplet was then measured. From these values was then calculated the contact angle by the following equation:

$$\theta = 2 \times \tan^{-1}(h/r)$$

(7) Method for evaluation of unevenness in coloring matter coating

The write once read many optical disc substrates obtained in the following examples and comparative examples were each observed for inward deviation from innermost true circle under an optical microscope. Those having even a single deviation of 0.5 mm or more over one circumference were considered uneven in coating.

EXAMPLE 1

In a 20 l vertical agitated stainless steel reaction vessel equipped with a condenser were charged 2,283 g (10.0 mols) of bisphenol A, 2,290 g (10.7 mols) of diphenyl carbonate, and 0.7 ml (7×10⁻⁶ mols per mol of bisphenol A) of 0.01 N solution of sodium hydroxide as a catalyst. The air within the reaction vessel was then replaced by nitrogen. The mixture was then heated to a temperature of 220° C. for 40 minutes so that the monomer as staring material was melted. The mixture was then reacted at 220° C. and $1.33 \times 10^4$ Pa for 60 minutes, at 240° C. and $2.00 \times 10^3$ Pa for 60 minutes and then at 270° C. and 66.7 Pa for 60 minutes. After the termination of reaction, the reaction solution was then fed to a twin-screw extruder by a gear pump. Butyl p-toluenesulfonate was then added to the reaction solution as a catalyst deactivator (twice the molar amount of sodium hydroxide used as catalyst). Further, to the reaction solution were added 4-t-butylphenylphenoxy-terminated oligomer obtained by interfacial polymerization process (number-average number of repeating units (m): 3), monoglyceride stearate as a releasing agent and AS329 (tris-nonylphenyl phosphite, produced by Asahi Denka Co., Ltd.) as a heat stabilizer in an amount of 0.5 parts, 0.02 parts by weight and 0.005 parts by weight based on 100 parts by weight of polycarbonate, respectively. The mixture was then kneaded.

The strand discharged from the extruder was then cut by a cutter to obtain pellets. As a result, a polycarbonate composition having a viscosity-average molecular weight of 15,500 was obtained.

(Production of Formed Substrate)

The polycarbonate composition thus obtained was then subjected to injection under the following conditions to obtain a formed substrate.

TABLE 1

| Forming machine: | DISK3, produced by Sumitomo Heavy Industries, Ltd.) |
| --- | --- |
| Mold: | Mold for 12 cmφCD, DVD |
| Thickness of formed substrate: | 1.2 mm |
| Depth of groove on stamper: | 160 nm |
| Pitch of grooves on stamper: | 0.80 μm |
| Maximum predetermined temperature of cylinder in forming machine: | 360° C. |
| Predetermined temperature of mold on the stamper side: | 130° C. |

TABLE 1-continued

| Injection time: | 0.1 second |
| --- | --- |
| Cooling time: | 7.0 seconds |
| Rotary speed of screw: | 360 rpm |
| Diameter of screw: | 25 mmφ |
| Clamping force: | 20 T during injection and dwell, 25 T during cooling |

(Coating of Coloring Matter)

To the formed substrate thus obtained was then applied a coloring matter solution having an azo-based organic coloring matter dissolved in octafluoropentanol by a spin coating method in such a manner that the grooves formed on the signal surface of the formed substrate were filled with the coloring matter solution. The coating began at a point of 2 mm inward from the innermost edge of the groove. The rotary speed of coating at the innermost circumference was 100 rpm. The subsequent coating over the entire surface of the substrate was conducted at 5,000 rpm. Thereafter, the substrate was put in a drying oven so that the remaining solvent was removed to prepare a write once read many optical disc substrate.

The results of evaluation of charged voltage and water droplet contact angle of formed substrate (before being coated with coloring matter) and coloring matter coating unevenness of write once read many optical disc substrate are set forth in Table 2.

The oligomer used in Examples 1 to 3 has a portion having one repeating unit in a proportion of 15% by weight, a portion having two repeating units in a proportion of 20% by weight, a portion having three repeating units in a proportion of 17% by weight, a portion having four repeating units in a proportion of 13% by weight, a portion having five repeating units in a proportion of 8% by weight and the balance of a portion having six or more repeating units. The proportion of alkylphenoxy group in oligomer, content of oligomer and total amount of oligomers having from 2 to 4 repeating units are set forth in Table 2 below.

EXAMPLE 2

A polycarbonate composition was obtained in the same manner as in Example 1 except that 4-t-butylphenylphenoxy-terminated oligomer (number-average number of repeating units (m): 3) as used in Example 1 was added in an amount of 1 part by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 3

A polycarbonate composition was obtained in the same manner as in Example 1 except that 4-t-butylphenylphenoxy-terminated oligomer (number-average number of repeating units (m): 3) as used in Example 1 was added in an amount of 5 parts by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 4

A polycarbonate composition was obtained in the same manner as in Example 1 except that 4-t-butylphenylphenoxy-terminated oligomer (number-average number of repeating units (m): 7) as used in Example 1 was added in an amount of 1 part by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 5

A polycarbonate composition was obtained in the same manner as in Example 1 except that 4-t-butylphenylphenoxy-terminated oligomer (number-average number of repeating units (m): 10) as used in Example 1 was added in an amount of 1 part by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 6

In a 20 l vertical agitated stainless steel reaction vessel equipped with a condenser were charged 2,283 g (10.0 mols) of bisphenol A, 2,290 g (10.7 mols) of diphenyl carbonate, and 0.7 ml ($7 \times 10^{-6}$ mols per mol of bisphenol A) of 0.01 N solution of sodium hydroxide as a catalyst. The air within the reaction vessel was then replaced by nitrogen. The mixture was then heated to a temperature of 220° C. for 40 minutes so that the monomer as staring material was melted. The mixture was then reacted at 220° C. and $1.33 \times 10^4$ Pa for 60 minutes, at 240° C. and $2.00 \times 10^3$ Pa for 60 minutes and then at 270° C. and 66.7 Pa for 60 minutes. After the termination of reaction, the reaction solution was then fed to a twin-screw extruder by a gear pump. Butyl p-toluenesulfonate was then added to the reaction solution as a catalyst deactivator (twice the molar amount of sodium hydroxide used as catalyst). Further, to the reaction solution were added 4-t-butylphenylphenoxy-terminated oligomer obtained by interfacial polymerization process (number-average number of repeating units (m): 3), Nonion LT221 (polyoxyethylene sorbitan monolaurate, produced by NOF CORPORATION) as an antistatic agent, monoglyceride stearate as a releasing agent and AS329 (tris-nonylphenyl phosphite, produced by Asahi Denka Co., Ltd.) as a heat stabilizer in an amount of 0.5 parts, 0.005 parts by weight, 0.02 parts by weight and 0.005 parts by weight based on 100 parts by weight of polycarbonate, respectively. The mixture was then kneaded.

The strand discharged from the extruder was then cut by a cutter to obtain pellets. As a result, a polycarbonate composition having a viscosity-average molecular weight of 15,400 was obtained.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 7

A polycarbonate composition was obtained in the same manner as in Example 6 except that Nonion LT221 as used in Example 6 was added in an amount of 0.03 parts by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

EXAMPLE 8

A polycarbonate composition was obtained in the same manner as in Example 6 except that Nonion LT221 as used in Example 6 was added in an amount of 0.06 parts by weight based on 100 parts by weight of polycarbonate.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

Comparative Example 1

A polycarbonate composition was obtained in the same manner as in Example 6 except that oligomers and Nonion LT221 as an antistatic agent were not added.

The viscosity-average molecular weight of the polycarbonate composition thus obtained, the proportion of alkylphenoxy group in oligomer, the content of oligomer and the total amount of oligomers having from 2 to 4 repeating units are set forth in Table 2 below. The polycarbonate composition was then used to prepare a write once read many optical disc in the same manner as in Example 1. The charged voltage and water droplet contact angle of the formed substrate (before being coated with coloring matter) and the coloring matter coating unevenness of the write once read many optical disc are set forth in Table 2.

represents —$Q^1$—$W^1$—$Q^2$—H or $Ar^2$—$Q^1$— in which $Ar^2$ represents an aromatic hydrocarbon group substituted by at least one alkyl group; $Q^1$ represents a single bond, —O— or —NH—; $Q^2$ represents —O— or —NH—; $W^1$ represents a divalent group having from not smaller than 6 to not greater than 50 carbon atoms; and n represents an integer of from 1 to 30.

3. The polycarbonate composition according to claim 1, wherein the oligomer (b) is a compound represented by the following general formula (1B):

TABLE 2

|  | Example 1 | Example 2 | Example 3 | Example 4 | Example 5 | Example 6 | Example 7 | Example 8 | Comparative Example 1 |
|---|---|---|---|---|---|---|---|---|---|
| Viscosity-average molecular weight (Mv) | 15,500 | 15,300 | 15,500 | 15,300 | 15,200 | 15,400 | 15,400 | 15,400 | 15,400 |
| Number-average number of repeating units (n) in oligomer | 3 | 3 | 3 | 7 | 10 | 3 | 3 | 3 | — |
| Proportion of alkylphenoxy group (mol %) | 98.9 | 98.9 | 98.9 | 98.5 | 98.3 | 98.9 | 98.9 | 98.9 | — |
| Parts by weight of oligomer based on 100 parts by weight of polycarbonate (a) | 0.5 | 1 | 5 | 1 | 1 | 0.5 | 0.5 | 0.5 | — |
| Total parts by weight of oligomers having from 2 to 4 repeating units based on 100 parts by weight of polycarbonate (a) | 0.25 | 0.5 | 2.5 | 0.2 | 0.1 | 0.25 | 0.25 | 0.25 | — |
| Added amount of antistatic agent (parts by weight) |  |  |  |  |  | 0.005 | 0.03 | 0.06 | — |
| Charged voltage (kV) | +1.8 | +2.2 | +2.8 | +1.1 | −0.2 | +2.0 | +2.1 | +2.2 | −10.8 |
| Contact angle with respect to water droplet (degree) | 83.5 | 85.6 | 86.8 | 82.1 | 80.5 | 84.2 | 85.9 | 87.5 | 72.5 |
| Unevenness in coloring matter coating | None | None | None | None | None | None | None | None | Observed |

While the invention has been described in detail and with reference to specific embodiments thereof, it will be apparent to one skilled in the art that various changes and modifications can be made therein without departing from the spirit and scope thereof.

This application is based on Japanese patent application No. 2001-323131 filed on Oct. 22, 2001, the entire contents thereof being hereby incorporated by reference.

What is claimed is:

1. A polycarbonate composition comprising:
   (a) a polycarbonate obtained by an ester exchange process; and
   (b) 0.01 to 0.5 parts by weight based on 100 parts by weight of the polycarbonate (a) of an oligomer having a molecular weight of from 300 to 8,000 and having any of ester bond, carbonate bond, amide bond and urethane bond in its molecule and an aromatic hydrocarbon group substituted by at least one alkyl group at the molecular end thereof.

2. The polycarbonate composition accord g to claim 1, wherein the oligomer (b) is a compound represented by the following general formula (1A):

(1A)

wherein $G^1$ represents a hydrogen atom or $Ar^1$—$Q^2$—CO— in which $Ar^1$ represents an aromatic hydrocarbon group substituted by at least one alkyl group; $G^2$

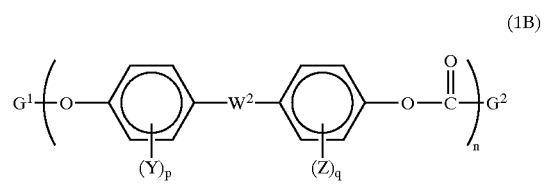

(1B)

wherein $G^1$ represents a hydrogen atom or $Ar^1$—O—CO— in which $Ar^1$ represents an aromatic hydrocarbon group substituted by at least one alkyl group; $G^2$ represents a group represented by the following general formula (2A):

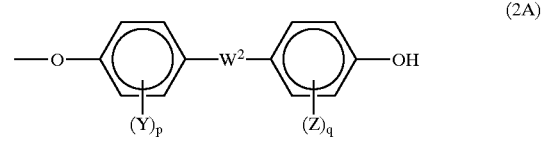

(2A)

or $Ar^2$—O— in which $Ar^2$ represents an aromatic hydrocarbon group substituted by at least one alkyl group; $W^2$ represents a single bond or a group selected from the group consisting of $C_1$–$C_8$ alkylene group, $C_2$–$C_8$ alkylidene group, $C_5$–$C_{15}$ cycloalkylene group, $C_5$–$C_{15}$ cycloalkylidene group and divalent groups represented by —O—, —S—, —CO—, —SO— and —$SO_2$—; Y and Z may be the same or different and each represents a halogen atom or $C_1$–$C_6$ hydrocarbon group; p and q may be the same or different and each represents an integer of from 0 to 2; and n represents an integer of from 1 to 30.

4. The polycarbonate composition according to claim 2 or 3, wherein $Ar^1$ and $Ar^2$ each represents a group represented by the following general formula (5A):

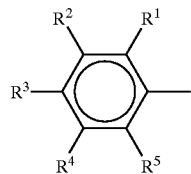

(5A)

wherein $R^1$ to $R^5$ each independently represents a hydrogen atom or $C_{1-C20}$ alkyl group, with the proviso that $R^1$ to $R^5$ do not represent a hydrogen atom simultaneously.

5. The polycarbonate composition according to claim 4, wherein $Ar^1$ and $Ar^2$ each represents a tertiary butylphenyl group.

6. The polycarbonate composition according to claim 2 or 3, wherein the proportion of the aromatic hydrocarbon group substituted by at least one alkyl group in all the molecular ends of the oligomer (b) is not smaller than 80 mol %.

7. The polycarbonate composition according to claim 2 or 3, wherein the number-average number of repeating units (n) in the general formula (1A) or (1B) is not greater than 20.

8. The polycarbonate composition according to claim 1, 2 or 3, wherein the content of the oligomer having repeating units in a number of from 2 to 4 in the general formula (1A) or (1B) in the oligomer (b) is from 0.02 to 15 parts by weight based on 100 parts by weight of the polycarbonate (a).

9. The polycarbonate composition according to claim 2 or 3, wherein the oligomer (b) is obtained by an interfacial polymerization process.

10. The polycarbonate composition according to claim 1, further comprising an antistatic agent (c).

11. The polycarbonate composition according to claim 10, wherein the antistatic agent is a polyoxyethylene fatty acid ester.

12. The polycarbonate composition according to claim 10 or 11, wherein the antistatic agent is incorporated therein in an amount of from 0.001 to 0.1 parts by weight based on 100 parts by weight of the polycarbonate.

13. A write once read many optical disc substrate comprising a polycarbonate composition according to claim 1, 2 or 3.

14. A write once read many optical disc obtained by applying a coloring matter to an optical disc substrate according to claim 13.

15. A process for the production of a write once read many optical disc which comprises injecting a polycarbonate according to claim 1, 2 or 3 to obtain a write once read many optical disc substrate, and then applying a coloring matter to the write once read many optical disc substrate by a spin coating process.

* * * * *